United States Patent [19]

Hawley et al.

[11] 4,258,834
[45] Mar. 31, 1981

[54] WINDING SYSTEM FOR FLEXIBLE CONDUITS AND CABLES

[75] Inventors: Royal T. Hawley, Everett; Jagdish C. Kalyan; Alvin D. Rogers, both of Seattle; Monte G. Sheppard, Marysville, all of Wash.

[73] Assignee: Western Gear Corporation, Everett, Wash.

[21] Appl. No.: 923,967

[22] Filed: Jul. 12, 1978

[51] Int. Cl.³ .............................................. H02G 11/00
[52] U.S. Cl. ............................... 191/12.2 R; 226/183; 242/82
[58] Field of Search ............... 191/12.2 A, 12, 12.2 R; 242/82, 54 A, 54 R, 83; 226/183; 114/254

[56] References Cited

U.S. PATENT DOCUMENTS

| 2,319,828 | 5/1943 | Rohweder | 242/83 |
|---|---|---|---|
| 2,472,860 | 6/1949 | Russell | 191/12.2 A |
| 3,120,017 | 2/1964 | Ciaccio | 242/54 R X |
| 3,669,377 | 6/1972 | Gilvar | 242/82 |
| 3,777,964 | 12/1973 | Kruner | 226/183 |
| 3,843,072 | 10/1974 | Rayfield | 242/82 |
| 4,108,264 | 8/1978 | Tanaka | 191/12.2 A X |
| 4,151,965 | 5/1979 | Manabe | 242/54 R |

Primary Examiner—Richard A. Schacher
Attorney, Agent, or Firm—Seed, Berry, Vernon & Baynham

[57] ABSTRACT

A cable winding system carried by a vehicle for extending and retracting cable responsive to vehicle movement. The cable frictionally engages a controllably powered sheave and is guided into a horizontally disposed coil by a cylindrical guide arm having a vertically directed opening adjacent the sheave and a downwardly, radially and circumferentially directed opening adjacent the coil. The guide arm is freely rotatable about a vertical axis so that as cable is extended and retracted the guide arm rotates to guide the cable between the coil and sheave. The powered sheave directs cable from the vehicle through an instrumented fairlead which, through a control system, controls the operation of the sheave. The fairlead is pivotally mounted about a horizontal pivot axis so that the head pivots in one direction as the cable is tensioned and in the opposite direction as the cable tension is relieved. The control system measures the angle of the fairlead and may also measure the vehicle speed to cause the sheave to extend cable as the fairlead moves rearwardly and/or the velocity of the forward vehicle is increased and to retract cable as the fairlead moves forwardly and/or the forward velocity of the vehicle is reduced. Also included is a failsafe system for applying the brakes of the vehicle when the supply of cable in the coil falls to a predetermined value or when the fairlead pivots to a point indicative of excessive cable tension and the rotational velocity of the powered sheave is below a predetermined value.

13 Claims, 7 Drawing Figures

WINDING SYSTEM FOR FLEXIBLE CONDUITS AND CABLES

BACKGROUND OF THE INVENTION

1. Field of the Invention

This invention relates to storage mechanisms for flexible conduits and cables, and more particularly, to a vehicle mounted system for winding a flexible conduit or cable in a horizontal coil and automatically extending and retrieving cable responsive to vehicle movement.

2. Description of the Prior Art

Vehicles which are electrically powered through a multi-conductor umbilical chord are commonly used in underground mines. These vehicles are generally load-haul and dump type mining machines. One problem with such vehicles is the need to extend the cable as the vehicle moves forwardly and retract cable as the vehicle moves rearwardly. This function has generally been accomplished in the past by winding the cable on a reel or drum which is rotatably mounted on a transverse horizontal axis. The power is transferred from the cable to the vehicle drive motor through slip rings such as utilized by conventional AC motors. The slip rings must be custom designed to fit within the relatively small available volume. The reel is generally powered by an electric or hydraulic motor. The hydraulically powered varieties are generally either dual pressure systems or constant tension systems.

The dual pressure system continuously applies a torque to the reel, but the torque is lower for cable extension or a stationary condition than for cable retrieval. For proper functioning of the system the low torque setting must be large enough to keep excessive cable sag or slack from developing. The minimum cable tension is 100 pounds.

The constant tension system applies a constant torque to the reel. The value of the torque is not critical, but again it must be large enough to keep slack or sag from developing in the cable. The minimum cable tension for the constant tension system is 150 pounds. These conventional reel systems exhibit many problems which are alleviated by the inventive cable winding system. A principal problem with the prior art technique is the need to employ slip rings which quickly deteriorate in the severe environmental conditions of a mine. Additionally, the high inertia of the reel and particularly the cable wound thereon reduces the transient response of the cable retracting and extending system. Good transient response can only be maintained, then, by providing a fairly high cable tension. Yet, a relatively high cable tension in itself causes problems. As the cable is wound on the reel with a tension, the inward force exerted by the cable on the reel continues to build up thereby preventing the cable from being adequately cooled and excessively compressing the underlying cable. Also, the cable often catches on irregular contours in a mine, and the cable tension causes violent whipping of the cable as the cable is released, thereby posing a serious safety hazard. Cable whipping also occurs when the vehicle stops or reverses direction suddenly, although this problem is less severe with the constant tension system than the dual pressure system.

Another problem with conventional reel systems is that they must receive cable from the rear so that the cable is often severely damaged by backing over the cable with the vehicle. For these reasons, conventional vehicle mounted cable storage devices have not been entirely satisfactory.

Another approach to the problem of extending, retracting and storing umbilical cable in a mining vehicle is described in U.S. Pat. No. 3,990,551 issued to Jamison et al. The Jamison et al device includes a pair of selectively driven rollers engaging the cable therebetween. The rollers convey the cable to and from a rectangular storage box through a slot without guiding the cable in a specific arrangement. A constant torque is applied to the rollers thereby maintaining the tension in the cable constant. Thus the Jamison et al devices does not solve most of the above mentioned problems.

SUMMARY OF THE INVENTION

It is an object of the invention to provide a cable winding system which is capable of retracting and extending cable from a vehicle without maintaining a significant tension on the cable.

It is another object of the invention to provide a system for winding a cable in a cylindrical configuration in a manner which allows the end of the cable to be connected to a vehicle without the use of slip rings.

It is still another object of the invention to provide a cable winding system having a relatively good transient response so that the cable winding mechanism is capable of responding to sudden changes in vehicle velocity.

It is a further object of the invention to provide a system for winding cable in a cylindrical configuration without placing the cable under tension in order to facilitate convection cooling of the cable and to preserve cable life.

These and other objects of the invention are accomplished by a powered drive mechanism for applying either a constant axial force to a cable or flexible conduit or an axial force having a magnitude and direction determined by a conduit control signal. A generally cylindrical conduit container receives the conduit from the drive mechanism through a guide arm which arranges the conduit in a generally cylindrical coil. The guide arm has a first end positioned adjacent a conduit port of the drive mechanism and a second end facing radially outwardly and circumferentially within the conduit container. The guide arm is rotatably mounted about an axis extending through the centers of both the conduit coil and the conduit port of the drive mechanism so that as cable is drawn through the drive mechanism the first end of the guide arm remains adjacent the conduit port while the second end of the guide arm moves circumferentially within the conduit container to arrange the conduit in a coil. The conduit extends from a point external of the vehicle to the drive mechanism through a fairlead which may pivot about a horizontal axis responsive to vehicle movement. The angle of the fairlead may be measured and utilized to actuate the drive mechanism to either retract or extend conduit responsive to vehicle movement. In order to provide good transient response without allowing excessive movement of the fairlead a feedback signal indicative of fairlead angle may be summed with the output of a tachometer to bias the control system in a conduit winding or unwinding condition responsive to vehicle movement. Alternatively, the drive mechanism may apply a constant tension to the conduit. The drive mechanism, which is preferably a powered sheave, may be pivotally mounted about a vertical axis extending through both the conduit port of the drive mechanism and the rotational axis of the guide arm in order to allow conduit to extend to the vehicle from a variety of directions.

DETAILED DESCRIPTION OF THE INVENTION

Figure 1:
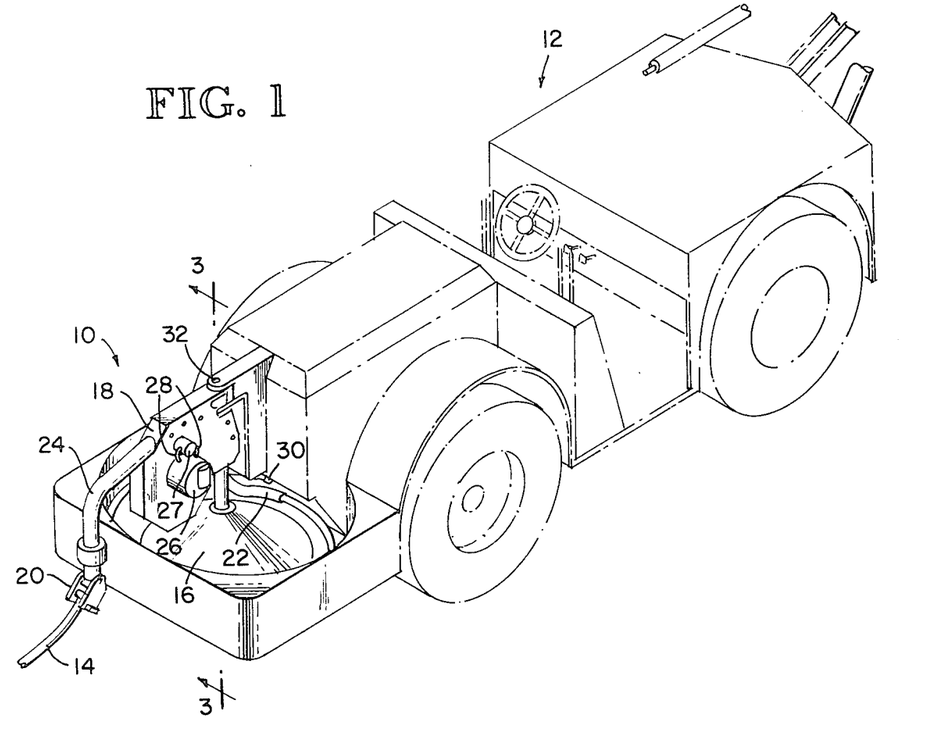
FIG. 1 is an isometric view of a mining vehicle with the inventive cable or conduit winding system installed thereon.
Figure 2:
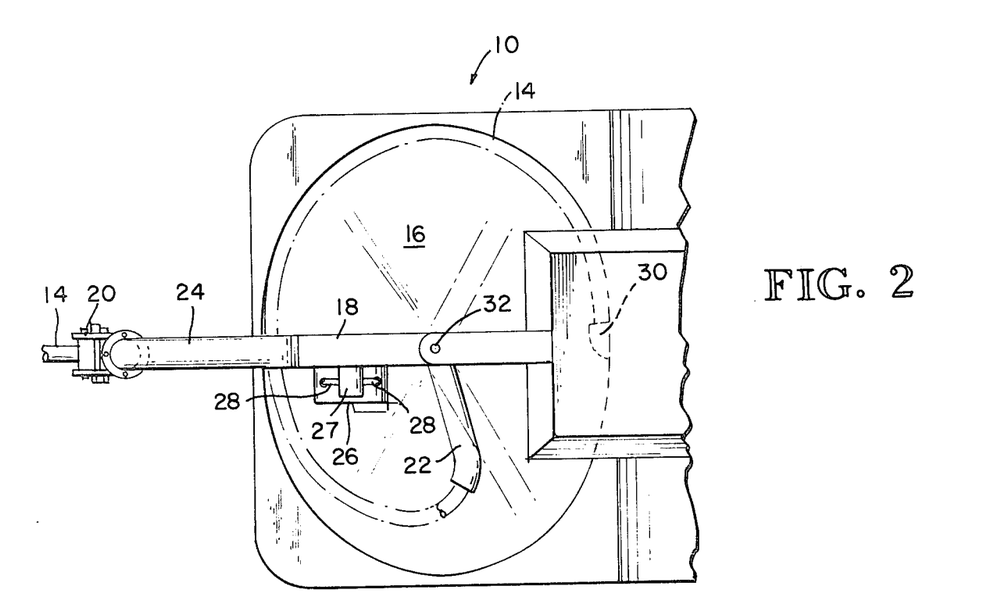
FIG. 2 is a top plan view of the conduit winding system.

The conduit winding system 10, as illustrated in FIGS. 1 and 2 installed on a conventional mining vehicle 12, is adapted to extend and retract a length of electrical conduit or cable 14 responsive to vehicle movement. Although the system 10 is described herein for use with cable, it may also be used with conduits for fluid as well as electricity. Consequently, the term "conduit" as used herein is intended to apply to all flexible, elongated members including cables and pipelines. The winding system 10 includes a generally cylindrical or oval cable storage area 16, a drive mechanism 18 for selectively applying an axial force to the cable 14, a fair-lead 20 for guiding and supporting the cable 14 between the drive mechanism 18 and a power source external of the vehicle 12, and a guide arm 22 for guiding the cable 14 between the drive mechanism 18 and cable storage area 16 and positioning the cable 14 in a cylindrical coil. The fairlead 20 is pivotally secured to a cylindrical cable guide 24 so that as the vehicle 12 moves away from the cable, the fairlead 20 pivots upwardly toward the deployed cable and away from the vehicle causing cable to be extended. Similarly, as the vehicle 12 moves toward the deployed cable, the fairlead 20 pivots through a vertical position toward the cable and vehicle casing cable to be retracted. Thus, as illustrated in FIG. 1, forward movement of the vehicle 12 causes the fairlead 20 to pivot rearwardly to extend cable, and rearward movement of the vehicle 12 causes the fairlead 20 to pivot forwardly to retract cable. It will be understood, however, that the cable 14 may extend from a point forwardly or to one side of the vehicle so that forward movement of the vehicle 12 may cause cable to be retracted and rearward movement of the vehicle 12 may cause cable to be extended.

As explained hereinafter, the angle of the fairlead 20 is measured and applied to control circuitry for selectively actuating the drive mechanism 18 to retract or extend cable 14. The drive mechanism 18 is powered by a conventional hydraulic motor 26 connected to a hydraulic servo valve 27 through conduits 28. The end of the cable 14 is anchored at 30 to the cylindrical sidewalls of the cable storage area 16. Since the cable 14 is fixedly anchored to the vehicle 12, conventional slip rings or similar devices are not required. Since the cable 14 is not wound on a reel, the inertia effect of the cable 14 is minimal, thus insuring good transient response.

The drive mechanism 18 is rotatably supported through a hinge 32 allowing the drive mechanism 18 to rotate about a vertical axis in order to receive cable 14 from a variety of points around the vehicle 12 in order to position the cable 14 away from the wheels of the vehicle thereby reducing cable damage. The guide arm 22 is rotatably supported about a vertical axis so that the guide arm 22 rotates as cable is retracted or extended by the drive mechanism 18. The rotational axes of the hinge 32 and the guide arm 22 are common to each other so that the position of the opening of the guide arm 22 with respect to a cable port for the drive mechanism 18 remains fixed as the drive mechanism 18 and guide arm 22 rotate.

Figure 3:
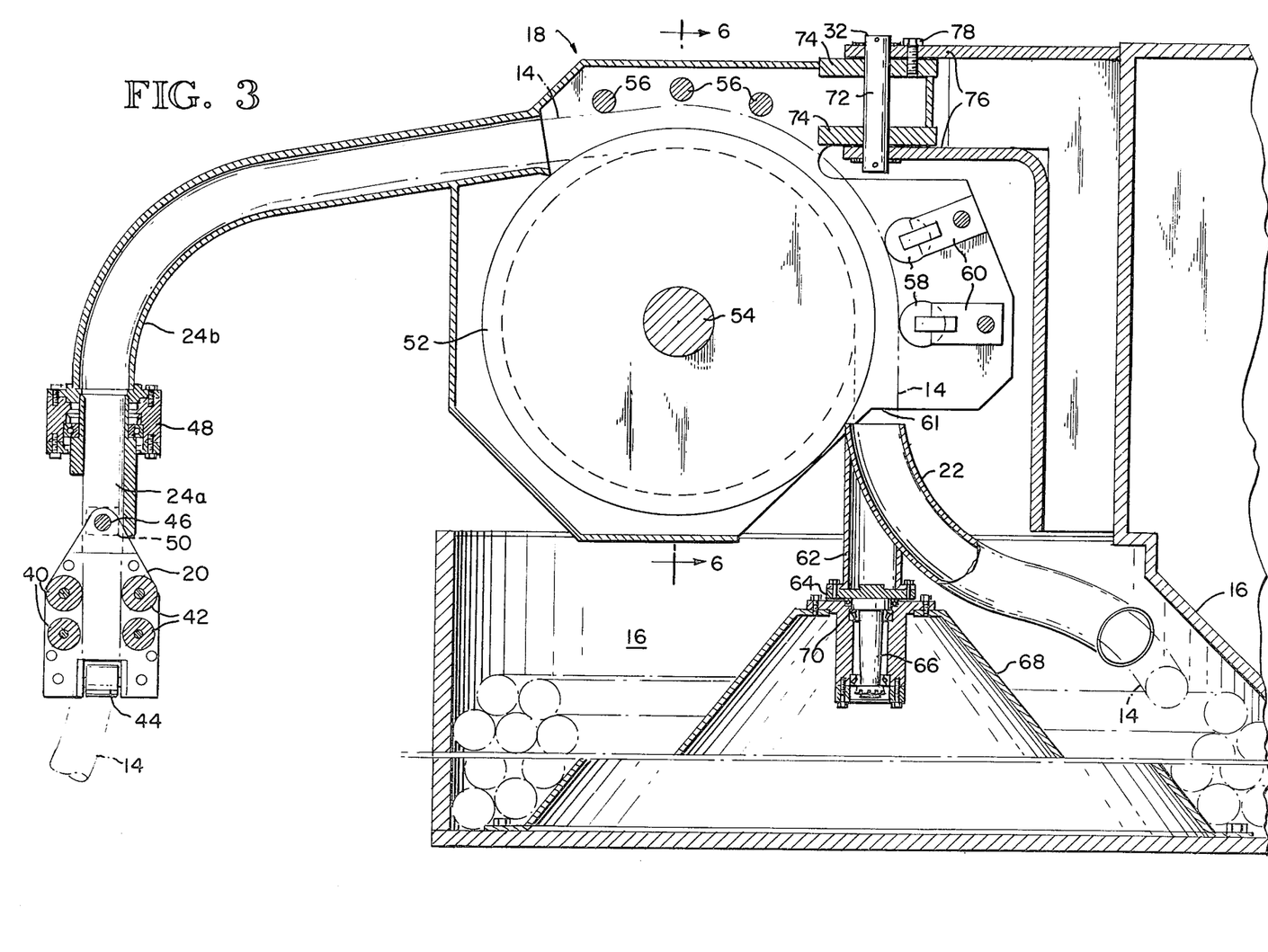
FIG. 3 is a cross-sectional view of the conduit winding system taken along the line 3—3 of FIG. 1.

The internal structure of the inventive cable winding mechanism is illustrated in further detail in FIG. 3. Cable 14 enters the fairlead 20 where it is supported by forward, rear and transverse rollers 40, 42, 44, respectively. As explained above, the fairlead 20 is pivotally secured to a cylindrical cable guide 24 by conventional bearings 46. A potentiometer 50 rotates with the fairlead 20 to provide an electrical indication of the fairlead position in order to control the drive mechanism as explained in greater detail hereinafter. The cable guide 24 is composed of two sections, a lower cable guide section 24a and an upper cable guide section 24b. The lower section 24a is rotatably secured to the upper cable guide section 24b by a conventional bearing mechanism 48 which allows the lower cable guide section 24a to rotate with respect to the upper cable guide section 24b about a vertical axis. The bearing mechanism 48 allows the cable 14 to extend from the fairlead 20 at a variety of azimuths even when the rotational position of the drive mechanism 18 is fixed. In the normal stationary condition the cable 14 assumes a natural catenary configuration as it extends to the ground with the fairlead 20 assuming an offset angle from the vertical that corresponds to the desired catenary of the cable at rest. Any forward or reverse movement of the vehicle changes the position of the fairlead 20 to produce a positive or negative error signal depending upon whether the movement tends to increase or decrease the angle of the catenary of the cable passing through the fairlead 20.

The cable 14 extends through the upper cable guide 24b and engages a rotatably mounted sheave 52 having an axle 54 connected to the hydraulic motor 26 (FIGS. 1 and 2). The periphery of the sheave 52 may have a variety of cross-sectional shapes, but the embodiment illustrated in FIGS. 3 and 6 utilizes a peripheral edge having a substantially rectangular shape. The cable 14 is positioned between the sheave 52 and a plurality of freely rotatable guide rollers 56. The rollers 56 loosely engage the cable 14 since they are not pressure rollers but are provided to prevent the cable 14 from bowing outwardly when the sheave 52 rotates counterclockwise as illustrated in FIG. 3. The cable 14 extends along the periphery of the sheave 52 to a pair of pressure rollers 58 which resiliently bias the cable 14 against the sheave 52. The rollers 58 are carried by hydraulic rams 60 which, as explained hereinafter, apply a constant force to the cable 14 but allow the rollers 58 to move away from the sheave 52 to accommodate splices in the cable 14 having a relatively large diameter.

Under some conditions the friction between the cable 14 and sheave 52 may be insufficient for optimum performance thereby allowing the cable 14 to slide or slip on the periphery of the sheave 52. Under these circumstances the alternative embodiment 18' of the conduit drive mechanism illustrated in FIG. 7 may be employed. In this embodiment 18' the cable 14 is gripped between a fixed flange 300 integral with a sheave 302 and a movable flange 304. The movable flange 304 is mounted on a hub 306 which is, in turn, mounted on a drive shaft 308 through a bearing 310. The bearing 310 allows the flange 304 to freely pivot about the axis of the shaft 308 so that the flange 304 can contact the cable 14 along the upper periphery of the sheave 302. The upper periphery of the sheave 302 is biased against the cable 14 by a pressure shoe 312 containing a roller 314 for allowing circumferential movement of the movable flange 304 with respect to the pressure shoe 312. The pressure shoe 312 is biased against the flange 304 by a conventional hydraulic ram 316. A plurality of circumferentially spaced guides 318 carried by the sheave 302 extend through apertures in the flange 304 to insure that the flange 304 rotates with the sheave 302. In operation the hydraulic motor 26 selectively rotates the shaft 308 in either direction which in turn rotates the sheave 302 through a hub 320 and the flange 304 through the beaming 310. The ram 316 continuously urges the pressure shoe 312 against the flange 304 through the roller 314 so that the cable is gripped between the flanges 300, 304.

Cable 14 is guided from a cable port 61 of the sheave 52 to the cable storage area 16 through the guide arm 22. The guide arm 22 is formed in a generally S-shaped configuration when viewed from both the top, as illustrated in FIG. 2, and the side, as illustrated in FIG. 3. The guide arm 22 is mounted on a cylindrical support 62 having an annular flange which is bolted to a circular plate 64. The plate 64 is mounted on a shaft 66 which is rotatably supported in a frustoconically shaped base 68 by bearings 70. The upper end of the guide arm 22 is tangent to the periphery of the sheave 52 and the axis of rotation of the arm 22 is tangent to the periphery of the sheave 52. Consequently, the upper end of the support arm 22 remains fixed with respect th the cable port 61 and the periphery of the sheave 52 as the guide arm 22 rotates. Similarly, the hinge 32, which includes a pin 72 extending through apertures in drive mechanism flanges 74 and support flanges 76, has an axis of rotation which is common to the rotational axis of the guide arm 22. Consequently, the upper end of the guide arm 22 remains fixed with respect to the sheave 52 as the drive mechanism 18 pivots. The position of the drive mechanism 18 is normally fixed by a locking bolt 78 extending through the flange 76 into flange 74.

Figure 6:
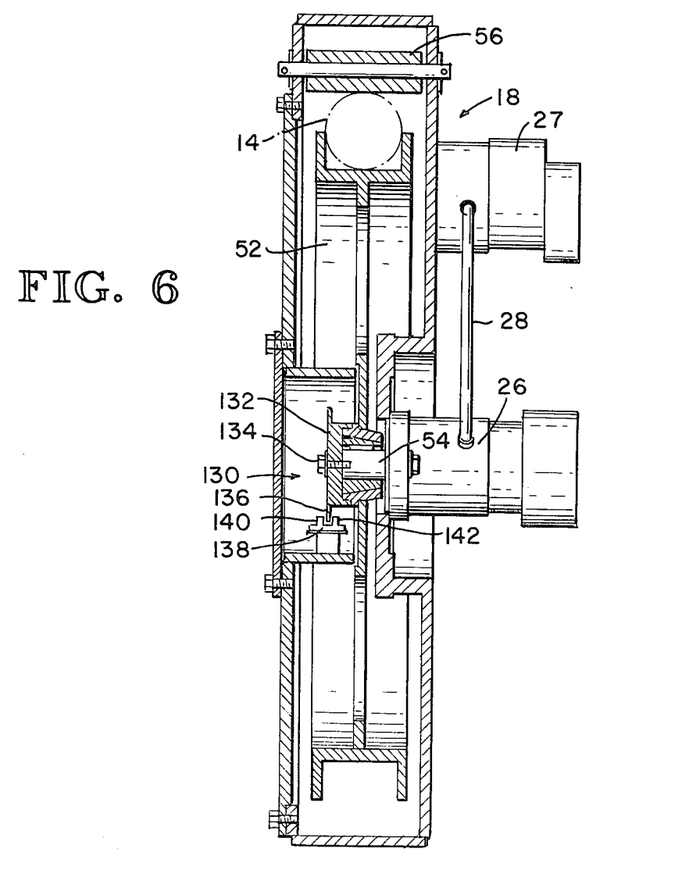
FIG. 6 is a cross-sectional view of the conduit drive mechanism take along the line 6—6 of FIG. 3.
Figure 7:
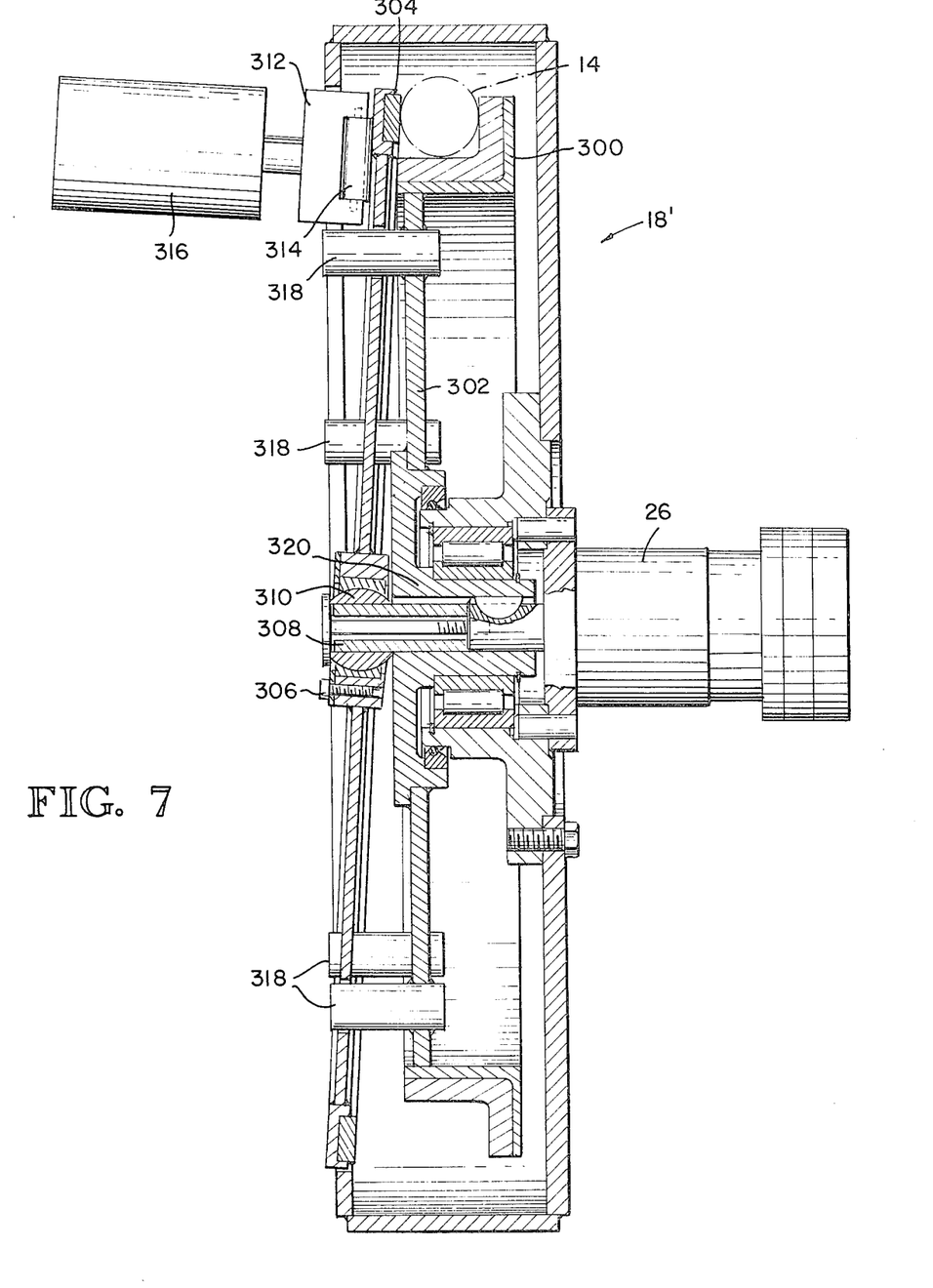
FIG. 7 is a cross-sectional view of an alternative embodiment of a conduit drive mechanism allowing the drive mechanism to exert a greater force on the cable.

In operation, when the vehicle moves away from the cable, the increased tension on cable 14 causes the fairlead 20 to pivot toward the direction from which the cable extends. As explained hereinafter, pivotal movement of the fairlead 20 actuates the hydraulic motor 26 thereby causing the sheave 52 to rotate counterclockwise in order to extend cable from the fairlead 20. The fairlead 20 then pivots downwardly to the desired offset for a neutral position. As the sheave 52 rotates counterclockwise, the guide rollers 56 (FIG. 6) prevent the cable 14 from buckling while the pressure rollers 58 cause the cable 14 to frictionally engage the periphery of the sheave 52. As cable 14 is drawn from the guide arm 22 the guide arm 22 rotates counterclockwise thereby removing cable 14 from the cable storage area 16. Alternately, as illustrated in FIG. 7, as the vehicle moves toward the cable, the fairlead 20 pivots away from the direction from which the cable extends thereby actuating the hydraulic motor 26 to rotate the sheave 52 clockwise. Cable 14 is then drawn inwardly through the fairlead 20 causing the fairlead 20 to pivot rearwardly toward its neutral position. As the sheave 52 continues to rotate clockwise, the guide arm 22 rotates counterclockwise thereby winding cable 14 in the cable storage area 16. The cable 14 is relatively loosely wound in the cable storage area 16 thereby allowing good convection cooling of the cable 14 and freeing the cable from damaging forces exerted on each other. When a cable splice having a relatively large dimension is encountered, the pressure rollers 58 are permitted to move away from the sheave 52 while the splice passes therebetween.

Alternatively, the hydraulic motor 26 may apply a constant torque to the sheave 52 in a cable retracting direction to impart a constant tension to the cable. In this configuration, the fairlead 20 is not instrumented, and the cable is extended and retracted responsive to vehicle movement as in the conventional drum mounted system. Even this simplified alternative system is a great improvement over prior art systems since it eliminates slip rings, high reel inertial and high cable storage tension of conventional reel systems.

One advantageous property of the inventive cable winding mechanism is its adaptability to various size cables. The system may be modified to handle a differeing cable diameter by simply unbolting the lower cable guide 24a and fairlead 20 from the upper cable guide 24b at the bearing mechanism 46, replacing the sheave 52 with one having a different transverse dimension, and replacing the guide arm 22 by unbolting the guide arm support 62 from the support plate 66.

Figure 4:
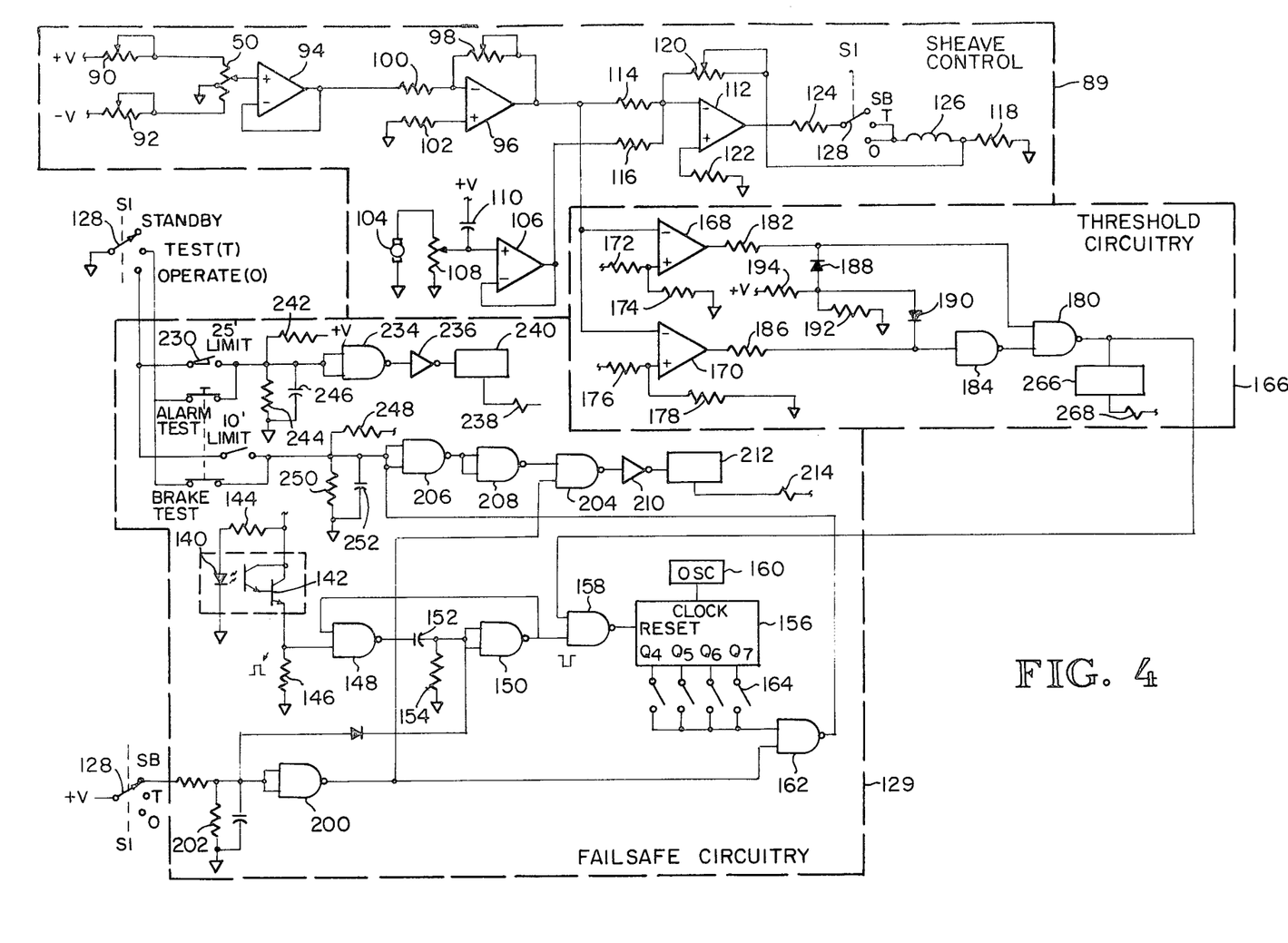
FIG. 4 is a schematic of the control circuitry for the conduit winding system.

The circuitry for controlling the operation of the cable winding system is illustrated in FIG. 4. The circuitry includes sheave control circuitry 89 receiving the output of the potentiometer 50 connected to the fairlead support pin 48. The potentiometer 50 is connected to plus and minus supply voltages through variable resistors 90, 92 which may be adjusted to control the magnitude of the signal on the wiper of the potentiometer 50 for a given movement of the fairlead 20. Thus, by decreasing the value of resistor 90 and increasing the value of resistor 92, the voltage at the wiper of potentiometer 50 will be larger for a given upward movement of the wiper than for the same movement of the wiper downwardly. Since the wiper of the potentiometer 50 is grounded, the voltage on the wiper is always zero for a neutral fairlead position. The wiper of potentiometer 50 is connected to an operational amplifier 94 arranged as a voltage follower. The output of the amplifier 94 is amplified by operational amplifier 96 having a gain which is proportional to the ratio of the resistance of potentiometer 98 to the resistance of resistor 100. In accordance with good design practice, the resistance of resistor 102 is approximately equal to the parallel combination of resistances 98, 100. The output of amplifier 96 is thus a positive or negative voltage proportional to the rearward or forward pivotal movement of the fairlead 20.

In accordance with an optional, unessential feature of the invention, the fairlead positon signal may be combined with a vehicle speed signal to control the hydraulic motor 26.

The speed of the vehicle 12 may be measured by a conventional tachometer 104 and applied to a voltage follower operational amplifier 106 through potentiometer 108. The voltage on the wiper of potentiometer 108 is filtered by capacitor 110. The voltage at the output of amplifier 106 which is proportional to vehicle speed, and the voltage at the output of amplifier 96 which is proportional to fairlead position, are applied to summing amplifier 112 through resistors 114, 116, respectively. Amplifier 112 produces a voltage across a current sensing resistor 118 which is proportional to the sum of the vehicle speed voltage at the output of the amplifier 106 and the fairlead position voltage at the output of the amplifier 96. The magnitude of the voltage across current sensing resistor 118 for a given vehicle speed voltage or fairlead position voltage is determined by the ratio of the resistance of potentiometer 120 to the resistance 114 or 116, respectively. The value of resistor 122 is approximately equal to the resistance of the parallel combination of resistors 114, 116, 120. The voltage across current sensing resistor 118 is proportional to the current therethrough. All of the current flowing through resistor 118 essentially flows through resistor 124 and solenoid coil 126 when the switch 128 is in either the test or operate modes as explained hereinafter. The servo coil 126 controls the operation of the hydraulic motor 26 as explained hereinafter. The magnitude and direction of the current flowing through the servo coil 126 is thus proportional to the fairlead position voltage at the output of amplifier 94 or, where the vehicle speed option is employed, the sum of the fairlead position voltage, and the vehicle speed signal at the output of amplifier 106. At high vehicle speeds the voltage at the output of amplifier 112 must be relatively large. Without a signal proportional to vehicle speed, a larger pivotal movement of the fairlead 20 would be required to generate a sufficiently large signal at the output of amplifier 94. Alternatively, the loop gain of the system could be greatly increased, but this could introduce instability problems. The vehicle speed signal thus serves as a rough approximation of the required current through the coil 126 while slight corrective movements of the fairlead 20 produce a small corrective signal at the output of the amplifier 94. In most applications, however, the vehicle speed feedback option is not required.

The control system for the inventive cable winding system also includes failsafe circuitry 129 for applying the brakes of the vehicle when either the sheave 52 is unable to rotate as the vehicle moves or the supply of cable 14 in the storage area 16 falls to a predetermined value. The rotational velocity of the sheave 52 is measured by a speed sensor as illustrated in FIG. 6. The sensor 130 includes a hub 132 secured to the shaft of the hydraulic motor by a bolt 134. The hub 132 has integrally formed therein a flange 136 containing a plurality of circumferentially space apertures. The flange 136 extends between a sensing head 138 having an optical source such as a photodiode 140 and an optical sensor such as a phototransistor 142. Thus, as the sheave 52 rotates, light is alternately received by the phototransistor 142 from the photodiode 140 through the apertures in flange 136.

With reference, once again, to FIG. 4, current flows through the photodiode 140 through current limiting resistor 144, and current flow through phototransistor 142 and resistor 146 when light from photodiode 140 reaches phototransistor 142 through the apertures in flange 136. Thus, when the sheave 52 is rotating, a plurality of pulses are sequentially applied to NAND gate 148. NAND gate 148, in combination with NAND gate 150, capacitor 152 and resistor 154, form a one-shot which produces a pulse having a duration determined by the RC time constant of resistor 154 and capacitor 152 at the end of each pulse at the input of NAND gate 148. The sequentially generated pulses from NAND gate 150 are applied to the reset terminal of a counter 156 through NAND gate 158 when NAND gate 158 is enabled as explained hereinafter. When NAND gate 158 is disabled, a logic "1" at the output of NAND gate 158 holds the counter 156 in its reset condition. The counter 156 is normally incremented by clock pulses received from a conventional oscillator 160. One of the outputs of the clock 156 is applied to NAND gate 162 through switches 164 to apply the brakes of the vehicle as explained hereinafter.

NAND gate 158 is disabled to allow the clock 156 to increment by the output of threshold circuitry 166. Basically, the threshold circuitry 166 receives the hydraulic motor command signal from the output of amplifier 96 and determines whether the command signal exceeds a predetermined value in either the clockwise or counterclockwise direction. The command signal is applied to comparators 168, 170 which also receive positive or negative reference voltages from resistor dividers 172, 174 and 176, 178, respectively. The amplifier 168 thus detects a positive command signal while the amplifier 170 detects a negative command signal. The output of comparator 168 is applied to NAND gate 180 through resistor 182. The output of comparator 170 is applied to NAND gate 180 through NAND gate 184 and resistor 186. When the command signal is close to zero volts the output of comparator 168 is positive and the output of comparator 170 is negative. The positive voltage at the output of comparator 168 represents a logic "1" applied to NAND gate 180, and the negative output of comparator 170 is divided through resistor 186, diode 190, resistor 192 connected to ground and resistor 194 connected to positive voltage supply so that the input to NAND gate 184 is logic "0" thereby producing a "1" at its output. Consequently, the output of NAND gate 180 is logic "0" which disables NAND gate 158 and continuously applies a "1" to the reset terminal of counter 156 in order to prevent the counter 156 from incrementing. When the hydraulic motor command signal at the output of amplifier 96 exceeds a predetermined positive threshold the output of amplifier 168 goes negative thereby producing a "0" to its input to NAND gate 180 so that NAND gate 158 is enabled by the "1" at the output of NAND gate 180. Counter 156 is then allowed to increment between pulses from NAND gate 150, and if the sheave 52 has not rotated at a predetermined velocity, one of the outputs of the counter 156 will go high before the counter 156 is reset at the trailing edge of light transmitted from the photodiode 140 to the phototransistor 142. When the hydraulic motor command signal from amplifier 96 goes negative above a predetermined value, the output of amplifier 170 goes positive until the input to NAND gate 184 is at logic "1" at which point the "0" at the output of NAND gate 184 produces a "1" at the output of NAND gate 180 which enables NAND gate 158 to allow counter 156 to begin incrementing.

In either the test or operate modes, the input to NAND gate 200 is connected to ground through resistor 202 thereby producing a "1" at the output of NAND gate 200 which continuously enables NAND gate 162 and NAND gate 204. When one of the outputs of counter 156 as selected by switches 164 goes high responsive to the sheave 52 being unable to rotate a sufficient distance responsive to a command signal above a predetermined value, the "0" at the output of NAND gate 162 is twice inverted by NAND gates 206, 208 and applied to enabled NAND gate 204 to produce a "0" at the output of inverter 210 which actuates a solid-state relay 212. The solid-state relay 212 applies a signal through a coil 214 of the vehicle emergency brake. In the standby mode, a logic "1" is applied to NAND gate 200 through resistor 218 thereby producing a "0" at the output of NAND gate 200 which also applies the emergency brake through solid-state relay 212.

In the operate mode, as selected by mode select switch 226, the left side of a 25 foot limit switch 230 and a ten foot limit switch 232 are grounded. The limit switches 230, 232 are adapted to close when 25 feet and 10 feet, respectively, of cable remain in the cable storage area 16. When the 25 foot limit switch 230 is closed, a "1" at the output of NAND gate 234 is inverted by inverter 236 to produce a "0" which actuates the coil 238 of an alarm through solid state relay 240. The output of NAND gate 234 is normally held at "0" by the logic "1" voltage level at its input produced by resistor divider 242, 244. Capacitor 246 is provided to delay actuation of the horn for a short period after switch 230 is closed. When the cable remaining in the cable storage area 16 reaches the 10 foot limit, switch 232 is actuated thereby producing a "1" at the output of NAND gate 206 which actuates the emergency brake through a solid-state relay 212 in the same manner that the brake is actuated by NAND gate 162. The input to NAND gate 206 is normally held at a logic "1" voltage level by voltage divider resistors 248, 250 with capacitor 252 delaying the actuation of the brakes for a predetermined period after the 10 foot limit switch 232 closes. In the test mode, the left side of test switches 254, 256 are grounded so that manual actuation of the switches 254, 256 apply the alarm and emergency brake, respectively.

The threshold circuit 166 also relieves the load on the hydraulic pump driving the hydraulic motor 26 when the sheave 52 is stationary as indicated by a logic "0" at the output of NAND gate 180. The "0" at the output of NAND gate 180 is applied to a solid state relay 266 causing current to flow through the coil 268 of a solenoid valve to connect the output of the hydraulic pump to the return line.

Figure 5:
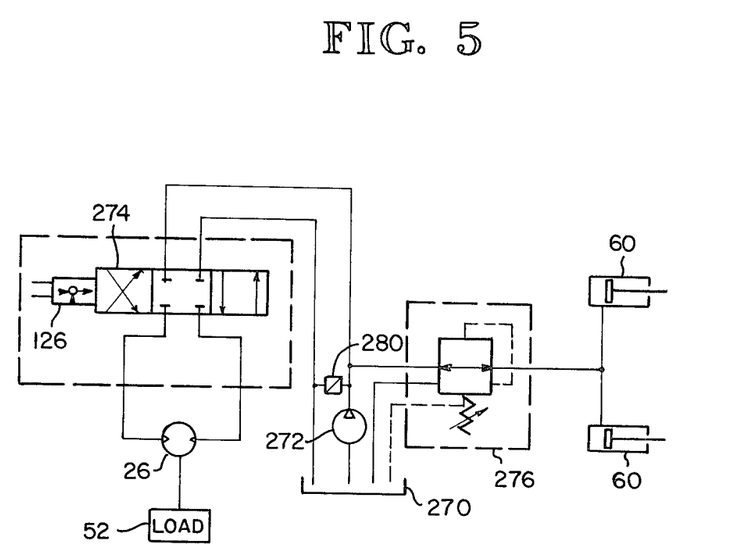
FIG. 5 is a schematic of the hydraulic mechanisms for the conduit winding system.

A schematic of the hydraulic system for the hydraulic motor 26 and pressure roller rams 60 is illustrated in FIG. 5. Hydraulic fluid stored in a reservoir 270 is pressurized by conventional hydraulic pump 272 and applied to a servo valve 274 having its control coil 126 connected to the hydraulic motor control circuitry illustrated in FIG. 4. The hydraulic motor 26 is connected to the output of the servo valve 274 so that the direction and magnitude of fluid flow through the hydraulic motor 26 is proportional to the magnitude and direction of the current through the servo valve control coil 126. The hydraulic cylinders 60 connected to the pressure rollers 58 (FIG. 3) also receive pressurized hydraulic fluid from the hydraulic pump 272 and are connected to the reservoir 270 through a pressure reducing valve with built-in relief 276 which allows the pressure rollers to retract and accommodate a splice while retaining a relatively constant force against the cable 14 and sheave 52. When the sheave 52 is stationary, current flows through a solenoid valve coil 268 as explained above. The coil 268 actuates a valve 280 to connect the output line of the pump 272 to the return line to prevent the pump 272 from laboring.

In the constant tension alternative system the hydraulic motor 26 is coupled directly to the hydraulic pump 272 so that the motor 26 applies a constant torque to the sheave 52.

We claim:

1. A vehicle mounted system for storing flexible conduit and retracting and extending said conduit responsive to vehicle movement, comprising:

powered drive means for applying an axial force to said conduit having a magnitude and direction determined by a conduit control signal;

a generally cylindrical conduit container adapted to receive said conduit from a first conduit port of said drive means and store said conduit in a generally cylindrical coil;

fairlead means for supporting said conduit extending from said drive means to a point external of said vehicle, said fairlead means being pivotally mounted about a horizontal axis such that movement of said vehicle toward said conduit causes pivotal movement of said fairlead from a neutral position in one direction and movement of said vehicle away from said conduit causes pivotal movement of said fairlead from a neutral position in the opposite direction;

a control system for generating said conduit control signal responsive to vehicle movement, said control system including transducer means for measuring the position of said fairlead with respect to said neutral position and for actuating said drive means to move said conduit in a direction restoring said fairlead to its neutral position; and guide means for guiding said conduit from said drive means to said conduit container, said guide means having a first end positioned adjacent the conduit port of said drive means and a second end facing radially outwardly, downwardly and circumferentially within said conduit container, said guide means being rotatably mounted about an axis extending approximately through the center of said conduit coil and the conduit port of said drive means such that as said drive means extends and retracts said conduit from said vehicle the second end of said guide means moves circumferentially within said conduit container to arrange said conduit in a coil while the first end of said guide means is maintained adjacent the conduit port of said drive means.

2. The system of claim 1 wherein said control system includes tachometer means for measuring the velocity of said vehicle, summing means for combining the output of said tachometer means with the output of said transducer means to generate a conduit extending control signal proportional to both the velocity of the vehicle and the angle of said fairlead with respect to said neutral position away from said conduit, and a conduit retracting control signal proportional to both the velocity of the vehicle and the angle of said fairlead with respect to said neutral position toward said conduit thereby allowing the use of a relatively low loop gain without the presence of a large deviation of said fairlead from its neutral position.

3. The system of claim 1 further including means for applying an emergency brake of said vehicle responsive to system malfunction comprising:

sensor means for determining the velocity of said conduit through said drive means and providing a conduit velocity signal proportional thereto, threshold means for providing an indication of a control signal larger than a predetermined magnitude and for enabling a comparator means in response thereto and for applying the emergency brake of said vehicle responsive to a conduit velocity signal below a predetermined magnitude.

4. The system of claim 3 wherein said comparator means comprise an oscillator, a resetable counter having its clock input connected to said oscillator and having an output connected to emergency brake actuator means, pulse generating means for producing a series of pulses having a frequency proportional to the velocity of the conduit through said drive means, gate means enabled by the output of said threshold means and receiving the output of said pulse generating means, said gate means having its output connected to the reset terminal said counter such that said counter applies the emergency brake of said vehicle after a predetermined period unless the conduit has moved through said drive means a predetermined distance within said period.

5. The system of claim 1 wherein said drive means include a rotatably mounted sheave engaging said conduit along its periphery, means for rotating said sheave responsive to said conduit control signal and a pressure roller carried by biasing means for urging said conduit against the periphery of said sheave, said biasing means including pressure relief means for allowing movement of said pressure roller away from said sheave to accommodate enlarged diameter sections of said conduit.

6. The system of claim 1 wherein said drive means include a rotatably mounted sheave having a fixed flange along its periphery integral with said sheave and a movable flange pivotably mounted about the rotational axis of said sheave along the periphery of said sheave opposite said fixed flange thereby allowing said cable to be positioned therebetween, said drive means further including bias means urging said movable flange toward said fixed flange at a location along the periphery of said sheave thereby causing said flanges to grip said cable therebetween.

7. The system of claim 6 wherein said bias means include a pressure shoe having a roller contacting the outside surface of said movable flange and a hydraulic ram conneacted to said pressure shoe and urging said pressure shoe toward said fixed flange.

8. A vehicle mounted conduit winding system, comprising:
a frustoconical base surrounded by cylindrical sidewalls defining a conduit storage area;
a selectively powered sheave having a horizontal axis of rotation;
a generally cylindrical guide arm rotatably mounted on said base, said guide arm having a first end tangent to the periphery of said sheave and a second end facing radially, circumferentially and downwardly toward said conduit storage area, said first end being positioned along the rotational axis of said guide arm such that the first end of said guide arm remains facing the periphery of said sheave as said guide arm rotates;
a fairlead pivotally mounted along an axis generally parallel to the rotational axis of said sheave;
a conduit sequentially engaged by said fairlead, sheave, and guide arm and terminating in said conduit storage area where the end of said conduit is fixedly secured to said vehicle;
transducer means for measuring the position of said fairlead and for generating a conduit retract signal responsive to pivotal movement of said fairlead toward said sheave and a conduit extend signal responsive to pivotal movement of said fairlead away from said sheave; and
control system means receiving the output of said transducer for rotating said sheave to move said conduit in a direction restoring said fairlead to its neutral position.

9. The conduit winding system of claim 8 wherein said control system includes tachometer means for measuring the velocity of said vehicle, summing means for combining the output of said tachometer means with the output of said transducer means to generate a conduit extending control signal proportional to the velocity of the vehicle and the angle of said fairlead away from said conduit, and a conduit retracting control signal proportional to the velocity of the vehicle and the angle of said fairlead toward said conduit thereby allowing the use of a relatively low loop gain without the presence of a large deviation of said fairlead from its neutral position.

10. The conduit winding system of claim 8 wherein said sheave and said fairlead are rotatably mounted about an axis coincident with the rotational axis of said guide means such that the periphery of said sheave remains adjacent the end of said guide means as said sheave and said fairlead rotate to engage conduit from a variety of points around said vehicle.

11. The conduit winding system of claim 8 wherein said guide arm is in the form of a compound curve having a generally S-shaped configuration when viewed from two orthagonal directions.

12. A vehicle mounted system for extending and retracting a length of flexible conduit, comprising:
powered drive means for applying an axial force to said conduit having a magnitude and direction determined by a conduit control signal;
fairlead means for supporting said conduit extending from said drive means to an external position, said fairlead means being pivotally mounted about a horizontal axis; and
a control system for generating said conduit control signal, said control system including transducer means for measuring the position of said fairlead, tachometer means for measuring velocity of said vehicle, and summing means for combining the output of said tachometer means with the output of said transducer means to generate a conduit extending control signal proportional to both the velocity of the vehicle and the angle of said fairlead away from said conduit, and a conduit retracting control signal proportional to both the velocity of the vehicle and the angle of said fairlead toward said conduit thereby allowing the use of a relatively low loop gain without the presence of a large deviation of said fairlead from a neutral position.

13. A vehicle mounted system for storing flexible conduit and retracting and extending said conduit responsive to vehicle movement, comprising:
powered drive means for applying an axial force to said conduit having a magnitude and direction determined by a conduit control signal;
a control system for generating said conduit control signal responsive to vehicle movement;
a generally cylindrical conduit container adapted to receive said conduit from a first conduit port of said drive means and store said conduit in a generally cylindrical coil;

guide means for guiding said conduit from said drive means to said conduit container, said guide means having a first end positioned adjacent the conduit port of said drive means and a second end facing radially outwardly, downwardly and circumferentially within said conduit container, said guide means being rotatably mounted about an axis extending approximately through the center of said conduit coil and the conduit port of said drive means such that as said drive means extends and retracts said conduit from said vehicle, the second end of said guide means moves circumferentially within said conduit container to arrange said conduit in a coil while the first end of said guide means is maintained adjacent the conduit port of said drive means; and fairlead means for supporting said conduit extending from said drive means to a point external of said vehicle, said fairlead being rotatably mounted about an axis coincident with the rotational axis of said guide means such that the conduit port of said drive means remains adjacent the first end of said guide means as said drive means and said fairlead rotate to engage cable from a variety of positions around said vehicle.

* * * * *